June 20, 1939. E. P. GOSLING ET AL 2,163,034
FLUID PRESSURE BRAKE
Filed Aug. 2, 1937 3 Sheets-Sheet 1
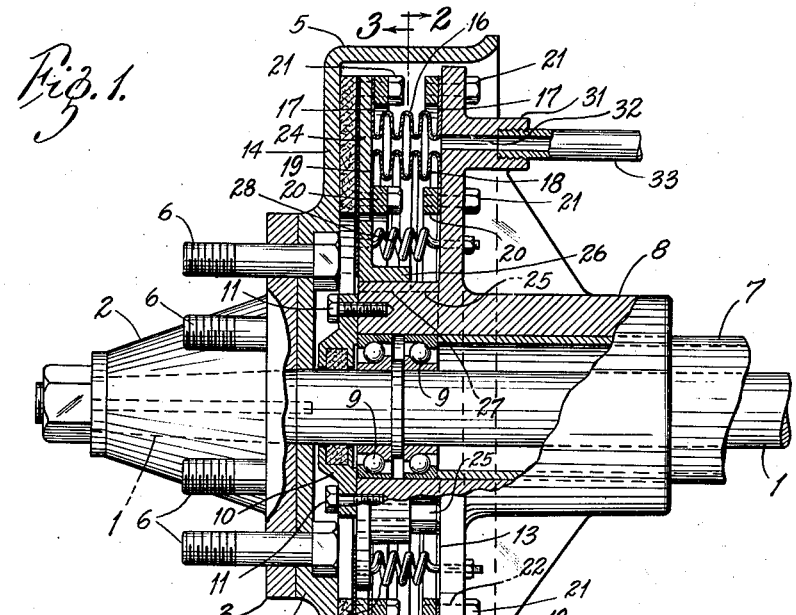
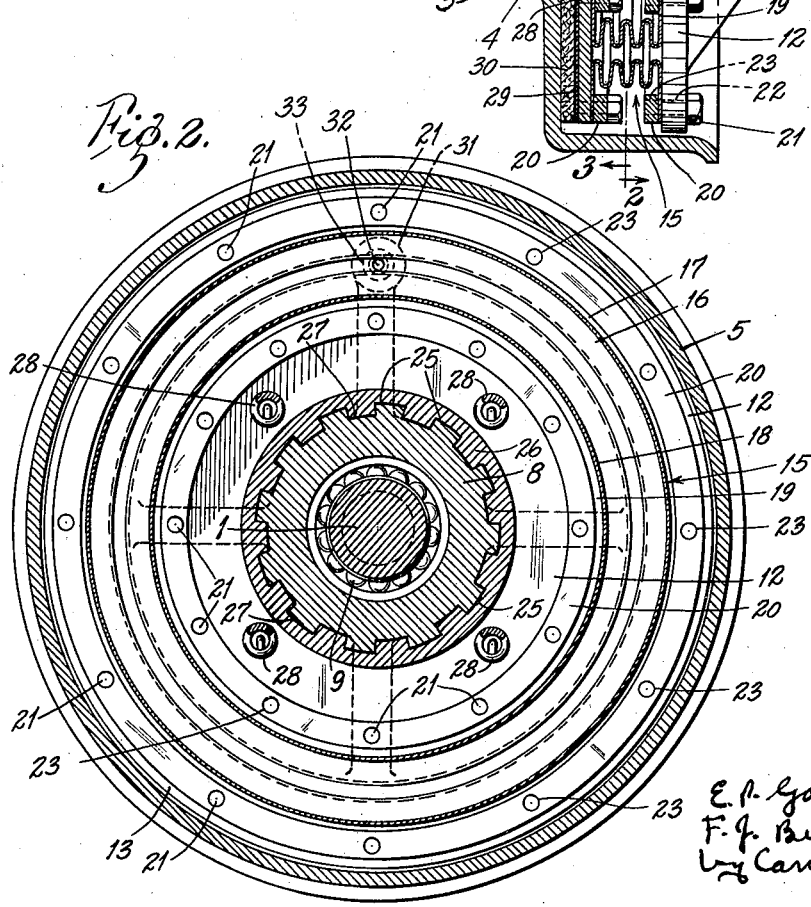
INVENTORS:
E. P. Gosling and
F. J. Bittermann,
by Carr Kant Gravely
THEIR ATTORNEYS INVENTORS:
E. P. Gosling and
F. J. Bittermann,
by Carl Van Gravely
THEIR ATTORNEYS.

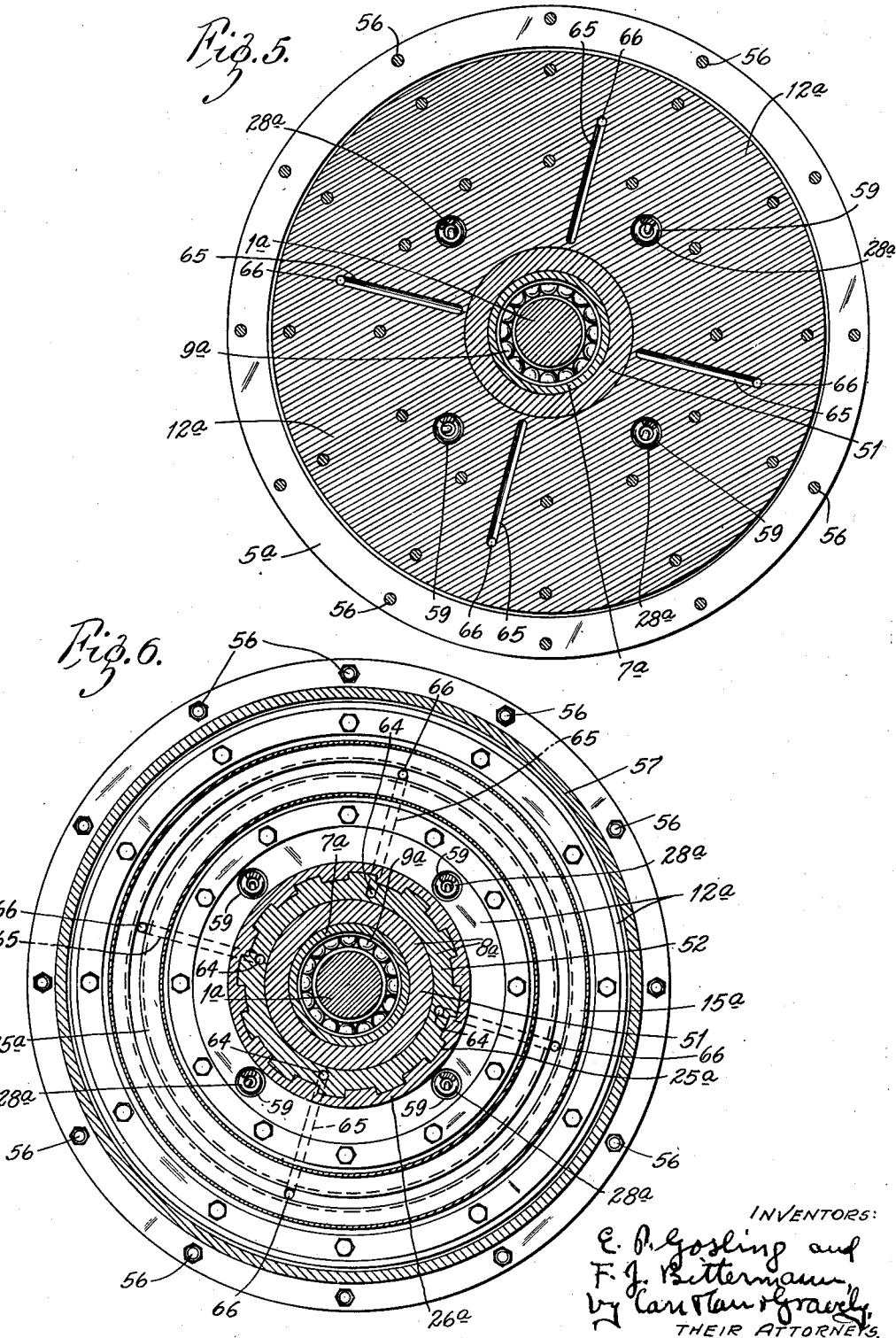

Patented June 20, 1939

2,163,034

UNITED STATES PATENT OFFICE 2,163,034

FLUID PRESSURE BRAKE

Edward P. Gosling and Ferdinand J. Bittermann, St. Louis, Mo.

Application August 2, 1937, Serial No. 156,854

5 Claims. (Cl. 188—72)

Our invention relates to fluid pressure brakes, and has for its principal object a fluid pressure brake of the disk type, wherein the pressure is evenly applied, wherein any desired pressure may be obtained which automatically compensates for wear and which is simple and compact in construction. Other objects and advantages will appear hereinafter.

The invention consists principally in the fluid pressure brake and in the parts and combinations and arrangements of parts hereinafter described and claimed.

Figure 3:
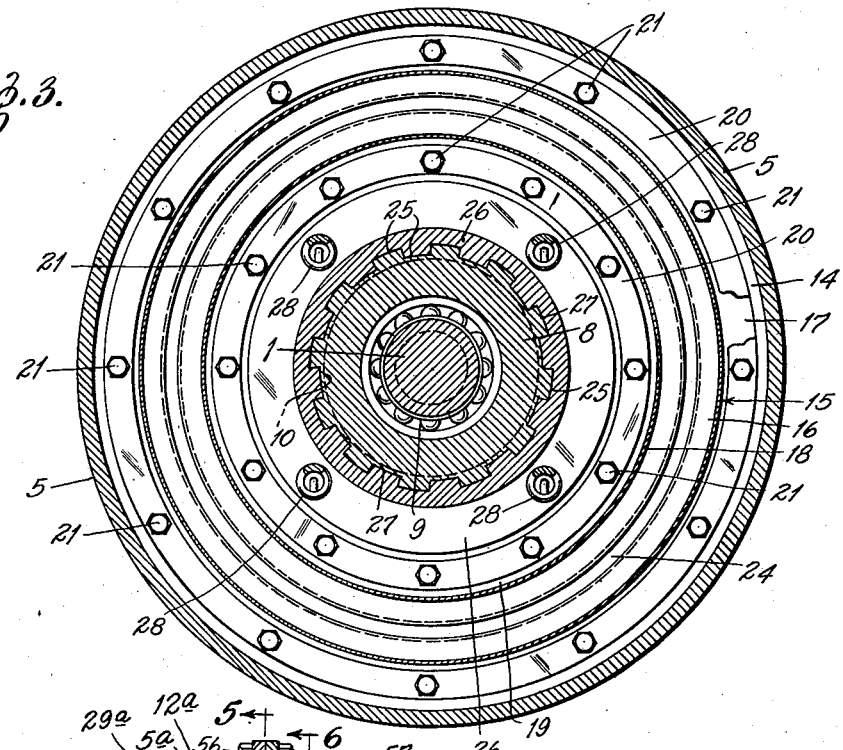
Figure 4:
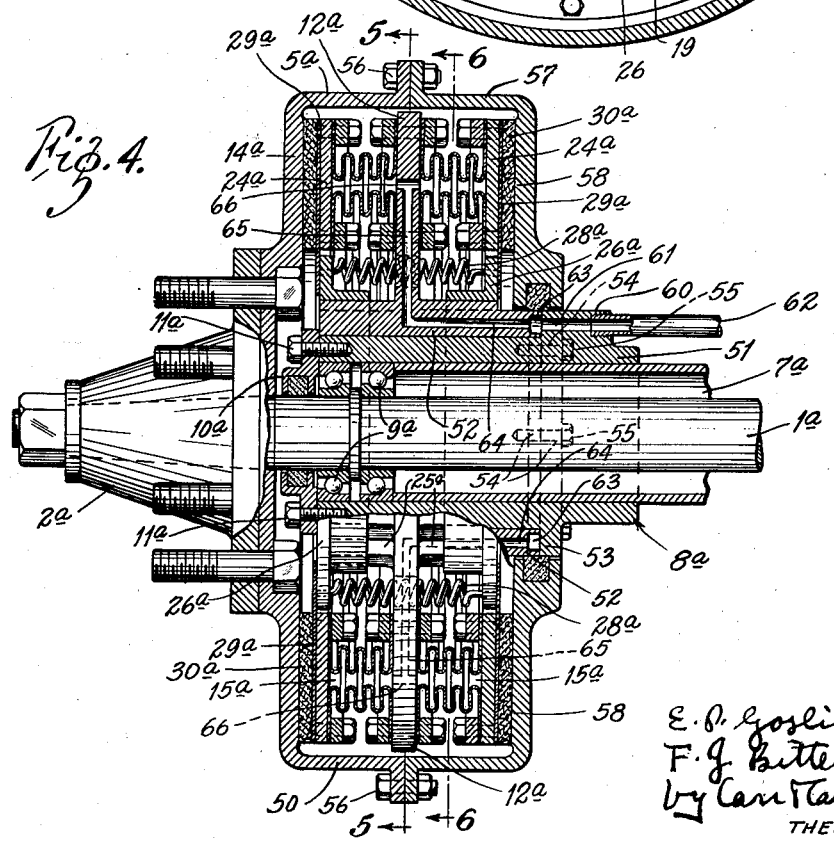

In the accompanying drawings,

Fig. 1 is a part elevation, part longitudinal sectional view of a brake construction embodying our invention, Fig. 2 is a sectional view on the line 2—2 in Fig. 1, Fig. 3 is a sectional view on the line 3—3 in Fig. 1, Fig. 4 is a view similar to Fig. 1, showing a modified construction using two brake disks and two operating bellows, Fig. 5 is a sectional view on the line 5—5 in Fig. 4; and Fig. 6 is a sectional view on the line 6—6 in Fig. 4.

In Figs. 1 to 3 is illustrated a single disk brake construction for an automobile wheel. On the end of the axle shaft 1 is mounted the usual wheel seat 2 having a radial flange 3 against one side of which the wheel (not shown in the drawings) abuts and against the other side of which is mounted the central disk portion 4 of a brake drum 5. Suitable studs 6 are provided for holding the brake drum 5 and the wheel in position.

Surrounding the body of the axle shaft 1 is the usual axle housing 7 on the end portion of which is mounted a tubular supporting casing 8 for the brake actuating mechanism. Said casing 8 projects beyond the end of the axle housing 7 and antifriction bearings 9 are interposed between the shaft 1 and said casing 8. A bearing retaining ring 10 is secured to the end of the casing 8 as by screws 11.

The supporting casing 8 has a radially disposed plate 12 integral therewith, hereinafter designated as the thrust plate. One face 13 of said thrust plate is parallel to and spaced some distance from the radial inner face 14 of the brake drum 5, said radial brake drum face constituting a brake disk.

Secured to the thrust plate 12, is an annular bellows member, indicated generally by 15. Said bellows member 15 includes an outer corrugated wall 16 having outwardly disposed radial end flanges 17 and an inner corrugated wall member 18 having inwardly disposed radial end flanges 19. The flanges 17, 19 at one end of the annular bellows member 15 are secured to said thrust plate 12 as by rings 20 extending around the peripheral portions of said end flanges and held in position by means of cap screws 21 extending through holes 22 in the thrust plate and in said end flanges into threaded holes 23 in said rings 20. The other end of the annular bellows member 15 is secured by similar rings 20 and screws 21 to a radially disposed ring 24, hereinafter designated as the pressure plate. Expansion of the bellows 15 moves said pressure plate 24 toward the brake disk 14.

The brake supporting casing 8 has splines 25 on its end portion and a hub 26 has internal splines 27 by means of which it is slidably but non-rotatably mounted on said supporting casing 8. Springs 28 secured to the thrust plate 12 and to the hub member 26 urge the hub member towards the thrust plate, that is, pull the hub member 26 away from the brake disk 14.

Secured to the hub member 26 is a disk 29 (hereinafter designated as a friction plate) whose outer peripheral portion is held in flatwise contact with the pressure plate 24 by the action of the springs 28. On the face of said disk adjacent to the brake disk 14 of the drum is a facing 30 of suitable friction material.

Said thrust plate 12 is provided with a projecting hollow boss 31 whose bore 32 communicates with the interior of the bellows 15 and which is connected with a fluid pressure line 33. The admission of fluid under pressure expands the bellows 15 and moves the pressure plate 24 and the hub member 26 with its associated parts toward the brake disk face of the brake drum, causing the friction material 30 to engage the brake disk 14. Upon release of the fluid pressure, the springs 28 disengage the braking surfaces.

In Figs. 4 to 6 is illustrated a double brake disk construction. The axle shaft 1a has a wheel seat 2a secured to the end thereof and a brake drum 5a projects from said wheel seat, said drum having an integral brake disk portion 14a and a cylindrical housing portion 50. The two-piece supporting casing, indicated generally as 8a, comprises a tubular member 51 mounted on the axle housing 7a, said tubular member 51 projecting beyond the end of the axle housing 7a, and a sleeve 52 mounted on the tubular member 51 with one end abutting against an integral flange or shoulder 53 provided therefor on the tubular member 51. Said flange 53 and the end of said sleeve 52 are provided with openings 54 to receive suitable securing screws 55. Interposed between the projecting portion of said tubular support 51 and the axle shaft 7a is a suitable bearing 9a which is held in position by means of a retaining ring 10a secured to the end of the tubular support 51 as by screws 11a.

Secured to the open end of the housing portion 50 of the brake drum 5a, as by screws 56, is a cover disk 57 having a radial inside face 58 constituting a brake disk. Projecting from the sleeve 52 centrally of the brake drum is the double thrust plate 12a, on each face of which is mounted an annular bellows member 15a for operating the brake. Said bellows members 15a are similar to those hereinbefore described and each has one end secured to a pressure plate 24a.

The sleeve member 52 has splines 25a on either side of the thrust plate 12a and internally splined hub members 26a are mounted thereon, said hub members 26a being urged towards each other and away from the brake disks 14a and 58 by means of springs 28a secured to the hub members 26a and passing through openings 59 provided therefor in said thrust plate 12a. Said hub members 26a have disks 29a secured thereto to which are secured suitable friction facings 30a.

The tubular supporting member is provided with a longitudinal web 60 in which is a passageway 61 that opens through said annular rib 53 and is connected with a supply line 62 through which fluid under pressure is furnished. Said passageway 61 opens into an annular passage 63 in the end face of said sleeve member 52 abutting against said flange 53. Longitudinal passageways 64 extend from said annular passageway 63 through said sleeve 52, each longitudinal passageway 64 communicating with a radial passageway 65 in the thrust plate 12a. Each radial passageway 65 terminates in a transverse passageway 66, the ends of which open into the respective bellows members 15a. The admission of fluid under pressure through the system of passageways into the two bellows members operates both sets of braking members.

The above described brake construction provides an enclosed brake thereby protecting the braking surfaces from dirt and foreign matter and the system is leak proof, even without the packings required in prior fluid brakes. The brake, whether single or double, is easily applied, it is self-energizing and disengagement is quick and uniform over the whole braking surface. Wear of the braking surfaces is automatically compensated for by increasing the fluid pressure and the degree of expansion of the bellows. The brake is self-adjusting and equal pressure is provided over all braking surfaces at all times. An unusually large area of braking surfaces is provided, which area may be easily increased by increasing the disk sizes or by adding more braking units. The brake operates on a very low pedal pressure. Toggles, pins and other mechanical parts required in prior fluid brakes are dispensed with, as are the pistons, packings, adjusting devices and other necessary parts of prior fluid brakes. The elimination of the toggles insures against locking of the wheels and elimination of other parts minimizes mechanical noises. The construction lends itself to varied types of friction material. Thus a low co-efficient friction material may be used, giving smooth and positive braking action and maintaining a low temperature over the contacting surfaces. A combination of high co-efficient and low co-efficient materials may be used, giving a fast and powerful braking action and fast deceleration without shock or sway. Adequate braking surface is provided to permit the use of all high co-efficient friction material, making it possible to concentrate the entire braking system, of an automobile for example, in one brake, as on the drive shaft of an automobile.

Obviously, numerous changes may be made without departing from the invention and we do not wish to be limited to the precise constructions shown.

What we claim is:

1. A fluid pressure brake comprising an axle having a brake drum mounted near the end thereof, said brake drum having a radial brake disk portion, a housing for said axle stopping short of said brake drum, a supporting casing mounted on said axle housing and projecting beyond the end thereof, a bearing interposed between said axle and said casing, a positioning ring securing said bearing in said casing, a radially disposed thrust plate projecting from said casing and spaced from said brake disk, said casing having splines on the end nearer said brake disk, an internally splined hub member mounted on said splined portion, a friction plate secured to said hub member for cooperation with said brake disk, a pressure plate disposed flatwise against the face of said friction plate remote from said brake disk, an annular bellows secured to said thrust plate and said pressure plate for forcing said friction plate towards said brake disk and means for supplying fluid under pressure to said bellows.

2. A fluid pressure brake comprising an axle having a brake drum mounted near the end thereof, said brake drum having a radial brake disk portion, a housing for said axle stopping short of said brake drum, a supporting casing mounted on said axle housing and projecting beyond the end thereof, a bearing interposed between said axle and said casing, a positioning ring securing said bearing in said casing, the outer peripheral portion of said ring overlapping said hub member, a radially disposed thrust plate projecting from said casing and spaced from said brake disk, said casing having splines on the end nearer said brake disk, an internally splined hub member mounted on said splined portion, a friction plate secured to said hub member for cooperation with said brake disk, a pressure plate disposed flatwise against the face of said friction plate remote from said brake disk, an annular bellows secured to said thrust plate and said pressure plate for forcing said friction plate towards said brake disk and means for supplying fluid under pressure to said bellows.

3. A fluid pressure brake comprising spaced rotatable brake disks, a stationary thrust plate intermediate therebetween, splined members projecting centrally from both faces of said thrust plate, hub members slidably splined on said splined members, a friction plate secured to each of said hub members for cooperation with one of said brake disks, a pressure plate disposed flatwise against each of said friction plates, an annular bellows secured to each face of said thrust plate and to one of said pressure plates for actuating one of said friction plates, means for supplying fluid under pressure to said bellows and springs urging said hub members together to disengage the braking surfaces.

4. A fluid pressure brake comprising an axle having a brake drum mounted near the end thereof, said brake drum having an internal radial brake disk portion and a cylindrical housing portion, a cover plate secured to said housing, its inner radial face also constituting a brake disk, an axle housing projecting through said cover plate, a sleeve mounted on the end of said axle housing and extending to a point near the central portion of said brake drum, said sleeve having a flange, a tubular member mounted on said sleeve against said flange, a thrust plate extending radially from said tubular member intermediate between said brake disks, hub members slidably but non-rotatably mounted on said tubular member on either side of said thrust plate, a friction plate secured to each hub member for cooperation with a brake disk, a pressure plate disposed flatwise against each friction plate, annular bellows members each secured to one face of said thrust plate and to one of said friction plates, springs urging said hub members together to disengage the braking members and means for supplying fluid under pressure to said bellows for engaging the braking members.

5. A fluid pressure brake comprising an axle having a brake drum mounted near the end thereof, said brake drum having an internal radial brake disk portion and a cylindrical housing portion, a cover plate secured to said housing, its inner radial face also constituting a brake disk, an axle housing projecting through said cover plate, a sleeve mounted on the end of said axle housing and extending to a point near the central portion of said brake drum, said sleeve having a flange, a tubular member mounted on said sleeve against said flange, a thrust plate extending radially from said tubular member intermediate between said brake disks, hub members slidably but non-rotatably mounted on said tubular member on either side of said thrust plate, a friction plate secured to each hub member for cooperation with a brake disk, a pressure plate disposed flatwise against each friction plate, annular bellows members each secured to one face of said thrust plate and to one of said friction plates, springs urging said hub members together to disengage the braking members and means for supplying fluid under pressure to said bellows for engaging the braking members, including an annular groove in the end of said tubular member against said flange, longitudinal passageways extending through said tubular member to said thrust plate, radial passageways in said thrust plate and transverse passageways in said thrust plate.

EDWARD P. GOSLING.
FERDINAND J. BITTERMANN.